(No Model.)
C. THURMAN.
SPITTOON.
No. 468,904. Patented Feb. 16, 1892.
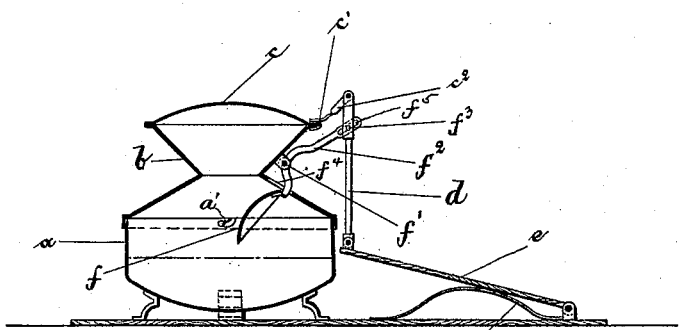
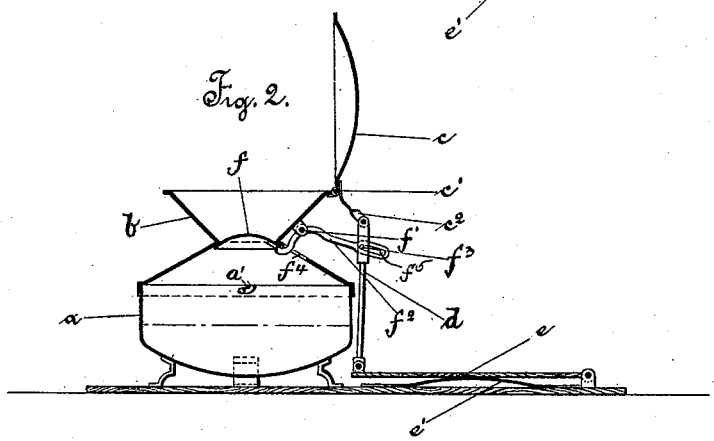

UNITED STATES PATENT OFFICE.

CLEMENS THURMAN, OF HEIDELBERG, GERMANY.

SPITTOON.

SPECIFICATION forming part of Letters Patent No. 468,904, dated February 16, 1892.

Application filed July 23, 1891. Serial No. 400,453. (No model.)

*To all whom it may concern:*

Be it known that I, CLEMENS THURMAN, a subject of the Grand Duke of Baden, and residing at Heidelberg, Baden, in the Empire of Germany, have invented certain new and useful Improvements in or relating to Spittoons, of which the following is a specification.

This invention relates to the class of spittoons consisting of a vessel partly filled with water and provided with a hopper or funnel-shaped top. The improved spittoon is characterised by the peculiar arrangement of two alternately closing and opening lids, one of which is arranged at the upper edge and the other at the lower part of the hopper or funnel. These two lids are adapted to be operated by a pedal. When at rest, the funnel is closed by the upper lid, while the lower lid is open. When, however, the pedal is pressed down with a view to using the spittoon, the upper lid opens and the lower one closes for the time being. Thus at all times one of the lids is closed and prevents unpleasant, or, in the case of invalids, deleterious emanations escaping from the main reservoir, the interior of which is moreover constantly concealed from view.

In the accompanying drawings, Figure 1 is a section of a spittoon of this description, shown in the position of rest; and Fig. 2 is a similar section of the spittoon when in use.

The funnel $b$, which is preferably removable to facilitate the cleaning of the spittoon, is arranged upon the reservoir $a$. Both parts are connected by bayonet-joints, as shown at $a'$. The upper lid $c$ is pivoted at $c'$ and is connected by the arm $c^2$ with the link $d$, to the lower end of which is pivotally connected the pedal $e$. A spring $e'$, arranged beneath the pedal, tends to maintain the same in the position shown in Fig. 1. The lid $f$, closing the lower end of the funnel, is secured to the lever $f^2$, pivoted at $f'$, which lever passes through a slot $f^4$, provided for the purpose in the funnel $b$, and by means of a slot $f^5$, with which it is itself provided, engages with a pin $f^3$, carried by the bar $d$. The position of the pin $f^3$ is such that in the condition of rest, Fig. 1, when the lid $c$ is closed it will cause the lid $f$ to remain open. When, however, pressure is applied to the pedal $e$, the lid $c$ opens and the lid $f$ closes, as in Fig. 2. The lid $f$ is inclined toward its edge or convex, so as to facilitate the descent of the expectoration into the reservoir $a$.

The form and construction of the details may be modified without departing from the principle of the invention.

I claim—

1. The combination, with a spittoon, of a lever pivoted to the funnel thereof, a slot in the reservoir of the spittoon through which one end of said lever projects, a lid carried by said end of the lever and adapted to close the opening intermediate the funnel and the reservoir, a second lid pivoted to the upper edge of the funnel and adapted to close the same, an arm connected at one end with said lid, a link connected at its upper end with the other end of the arm, said link being pivotally connected intermediate its ends with the lever, and a spring-operated foot-board connected at one end with the lower end of said link and adapted to depress the latter to cause the simultaneous raising of the two lids, in the manner and for the purposes specified.

2. The combination, with the spittoon, of the lever $f^2$, pivoted to the funnel exteriorly thereof, a slot $f^4$ in the reservoir through which projects one end of said lever, a lid $f$, carried by said end of the lever and adapted to close the opening intermediate the funnel and the reservoir, a slot $f^5$ in the opposite end of the lever, a lid $c$, pivoted at the upper edge of the funnel, an arm $c^2$, secured at one end to said lid, the link $d$, connected at its upper end to said arm, a pin carried by the link and engaging the slot in the lever, a foot-board connected at one end with the lower end of the link, and a spring arranged beneath said foot-board and normally maintaining the latter in an elevated position, all arranged and co-operating as and for the purposes specified.

CLEMENS THURMAN.

Witnesses:
KARL SPIEGELHALTER,
R. H. GROPP.